April 13, 1926.
H. BAILEY
1,580,991
SLIDING FOOT REST ACCELERATOR CONTROL
Filed June 12, 1925  2 Sheets-Sheet 1
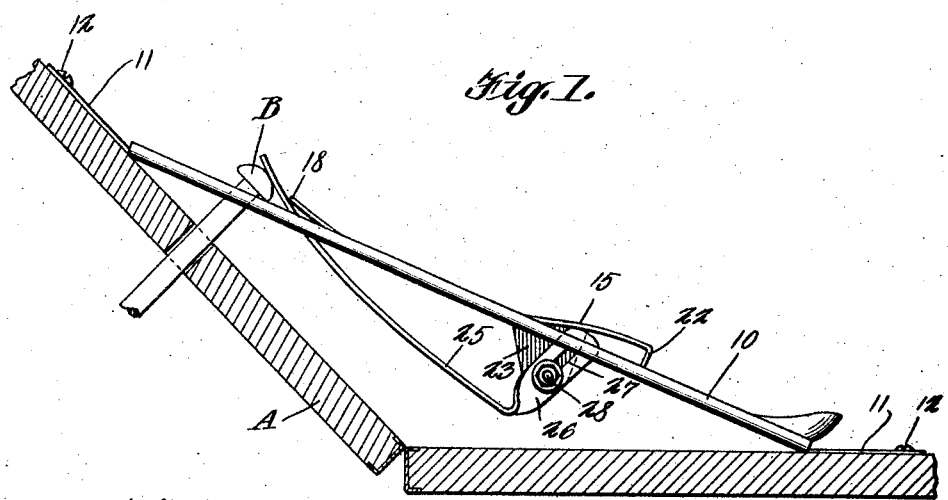
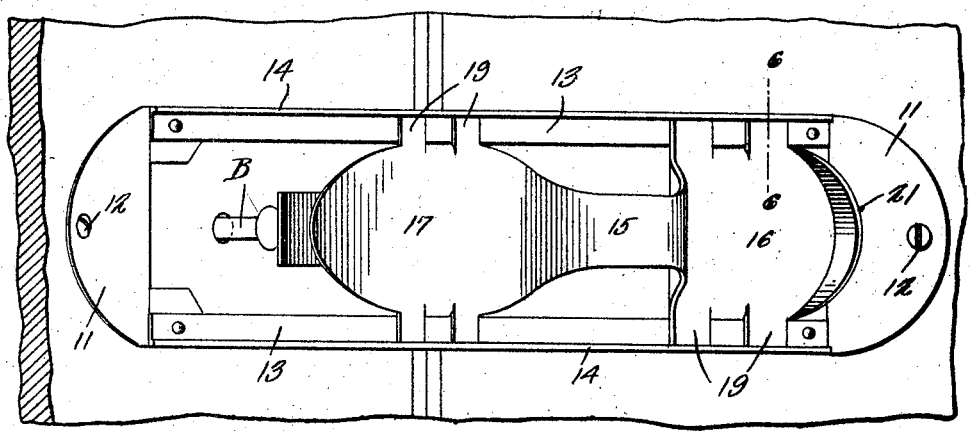
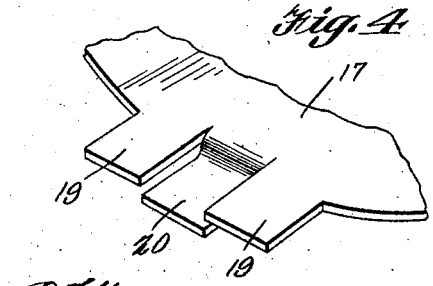
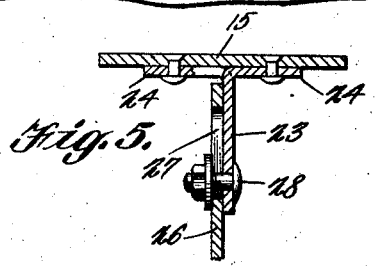
Harrison Bailey, INVENTOR
BY Victor J. Evans
ATTORNEY
WITNESS:

April 13, 1926.  1,580,991
H. BAILEY
SLIDING FOOT REST ACCELERATOR CONTROL
Filed June 12, 1925   2 Sheets-Sheet 2

Harrison Bailey, INVENTOR
BY Victor J. Evans
ATTORNEY

Patented Apr. 13, 1926.

1,580,991

UNITED STATES PATENT OFFICE.

HARRISON BAILEY, OF MOUNT CARMEL, PENNSYLVANIA.

SLIDING-FOOT-REST ACCELERATOR CONTROL.

Application filed June 12, 1925. Serial No. 36,702.

*To all whom it may concern:*

Be it known that I, HARRISON BAILEY, a citizen of the United States, residing at Mount Carmel, in the county of Northumberland and State of Pennsylvania, have invented new and useful Improvements in Sliding-Foot-Rest Accelerator Controls, of which the following is a specification.

This invention relates to control mechanism for automobiles and has for its object the provision of a novel foot accelerator control characterized by having a sliding movement in contradistinction to the usual pivotal movement, the advantage being that especially when travelling over rough and uneven roads the operator will not be subjected to any strain while at the same time the feeding of gasoline to the motor may be kept constant instead of variable as the result of inadvertent up and down movement of the foot.

An important object is the provision of a device of this character which will be simple and inexpensive to manufacture, easy to install, positive in action, efficient and durable in service, and a general improvement in the art.

Figure 3:
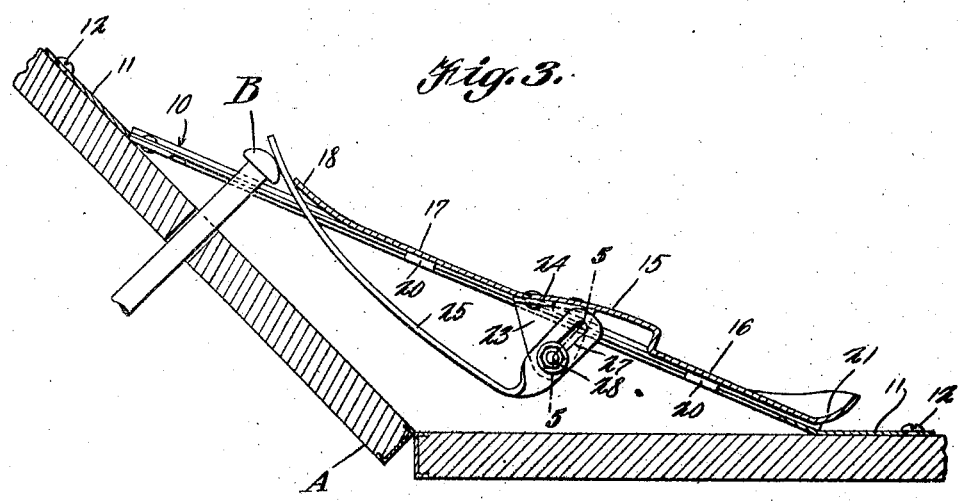
Figures 6, 7:
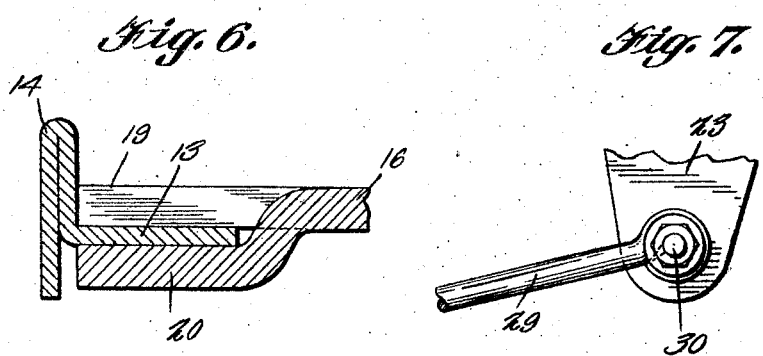

With the above and other objects and advantages in view, the invention consists in the construction and arrangement of parts to be hereinafter more fully described and claimed, and illustrated in the accompanying drawings in which:

Figure 1 is a vertical section through a portion of the floor boards of an automobile showing my device in operative relation to the accelerator pedal or button, Figure 2 is a plan view, Figure 3 is a longitudinal section, Figure 4 is a fragmentary perspective view showing the mounting for the movable member, Figure 5 is a detail section on the line 5—5 of Figure 3, Figure 6 is a detail section on the line 6—6 of Figure 2, Figure 7 is a fragmentary view illustrating a slight modification.

Referring more particularly to the drawings the letter A designates a portion of the floor boards of an automobile and B indicates the accelerator pedal or button. In carrying out the invention I provide an elongated combined support and guide 10 conveniently formed of sheet metal stamped to shape. This support is provided at its ends with extensions 11 through which may pass screws 12 or the like for effecting mounting upon the floor boards A. The central portion of this guide or support is open while the sides include longitudinal strips 13 at the outer edges of which are upstanding flanges or beads 14. This portion of the device is intended to be mounted in such position that the forward portion thereof will straddle the accelerator pedal or button B.

The movable portion of the device comprises a foot piece 15 adapted to support the operator's foot and including a heel portion 16 and a sole engaging portion 17 terminating in an extension 18. At the opposite sides of the heel and sole engaging portions 16 and 17 the metal is cut and bent to define tongues 19 and 20, the former of which are engaged upon the top of the guide strips 13 and the latter of which are downwardly offset as clearly shown in Figures 4 and 6 for engagement against the underside of the guide strips. This particular mounting permits the foot piece to slide longitudinally while lateral or vertical displacement is positively prevented. The sole engaging portion 17 is curved as shown to conform to the natural shape of the operator's foot and the heel portion includes an upstanding flange 21 engaging against the back of the heel, and an upstanding projection or shoulder 22 engageable by the breast or front of the heel.

Mounted on the underside of the foot piece 15 at some convenient point is a depending bracket or ear 23 having attaching portions 24 and constituting a support for an angular arm 25 which may be formed as a curved strip having one end laterally directed as shown at 26 and formed with a slot 27. The slotted portion is disposed against the bracket or ear 23 and is held in adjusted position with respect thereto by a suitable clamping bolt 28. The projecting forward end of the arm 25 extends above and in contact with the pedal or button B.

In the operation, it will be seen that when it is desired to increase the amount of fuel fed to the motor, the operator should slide his foot forwardly whereupon the arm 25 engaging the pedal or button B will cause additional depression thereof and further opening of the engine throttle. Conversely, the speed of the motor may be decreased by simply sliding the foot, and consequently the foot piece 15 rearwardly.

In case the device is used in connection with automobiles which are unprovided with foot accelerator pedals, use may be made of a rod 29 connected with the throttle arm in any suitable manner, not shown, and pivotally connected with the bracket or ear 23 as shown at 30 in Figure 7. The operation in this instance would be exactly the same as above described.

From the foregoing description and a study of the drawings it will be apparent that I have thus provided a very simple, inexpensive and neat accelerator control device which entirely does away with a hinging or pivoting movement of the foot or of an accessory engaging the accelerator pedal or button, the movement involved being simply a natural sliding one which will facilitate driving especially over rough roads.

While I have shown and described a preferred embodiment of the invention, it should be understood that I reserve the right to make all such changes in the form, construction and arrangement of parts as will not depart from the spirit of the invention or the scope of the subjoined claims.

Having thus described the invention, I claim:

1. An accelerator pedal control device comprising a supporting guide adapted to be mounted upon the floor boards of an automobile adjacent the accelerator pedal and in straddling relation thereto and a foot engaging member slidably mounted upon the guide and having a portion engageable with the pedal.

2. An accelerator pedal control device comprising a supporting guide adapted to be mounted upon the floor boards of an automobile adjacent the accelerator pedal, a foot engaging member slidably mounted upon the guide and a pedal engaging member adjustably carried by said foot engaging member.

3. In a device of the character described, an elongated frame-like support adapted to be mounted upon the floor boards of an automobile in straddling relation to the accelerator pedal, a foot engaging member slidably mounted upon said guide and shaped for conforming engagement with the operator's shoe, a depending bracket on said member, and an angular arm adjustably mounted on the bracket and located in engagement with the pedal.

4. In a device of the character described, an elongated supporting member adapted to be mounted upon the floor boards of an automobile adjacent the accelerator pedal, a foot engaging member slidably mounted upon said support, a depending bracket on said member, and an angular arm adjustably mounted on the bracket and located in engagement with the pedal.

In testimony whereof I affix my signature.

HARRISON BAILEY.